United States Patent [19]

Ladriere

[11] 3,911,487

[45] Oct. 7, 1975

[54] MAGNETIC TAPE PLAYBACK UNIT WHICH SEQUENTIALLY SWITCHES BETWEEN FOUR TRACKS BY DETECTING END OF TRACK SILENCE

[76] Inventor: Serge Ladriere, 2, rue des Pavillons, 92000 Nanterre, France

[22] Filed: Feb. 23, 1973

[21] Appl. No.: 335,046

[30] Foreign Application Priority Data

Apr. 19, 1972 France .............................. 72.13733
Nov. 24, 1972 France .............................. 72.41795

[52] U.S. Cl. ....................... 360/63; 360/74; 360/78; 179/100.1 VC

[51] Int. Cl.²...G11B 15/12;G11B 15/48;G11B 21/08

[58] Field of Search ............. 360/63, 74, 93, 94, 96, 360/78; 179/100.1 VC

[56] References Cited

UNITED STATES PATENTS

| | | | |
|---|---|---|---|
| 3,573,393 | 4/1971 | Blackie | 360/74 |
| 3,604,714 | 9/1971 | Staar | 360/63 |
| 3,612,542 | 10/1971 | Marcinkus | 360/74 |
| 3,647,989 | 3/1972 | Mattas | 360/74 |

*Primary Examiner*—Bernard Konick
*Assistant Examiner*—Alan Faber
*Attorney, Agent, or Firm*—Cushman, Darby & Cushman

[57] ABSTRACT

Apparatus for reproducing sound recordings from a multi-track tape in a cassette or cartridge including a number of detecting heads each mounted for detecting signals from one of the tracks and a electronic switch for coupling each of the heads in turn to a sound producing circuit. Track changing can be initiated by detection of a period of silence exceeding a fixed time interval. The apparatus is preferably started on the same track by the insertion of a cassette or cartridge into the apparatus.

8 Claims, 41 Drawing Figures

FIG. 21.

| | Ca1 | Ca2 | Ca3 | Ca4 |
|---|---|---|---|---|
| T1 | +15 | −15 | −15 | −15 |
| T3 | −15 | +15 | −15 | −15 |
| T2 | −15 | −15 | +15 | −15 |
| T4 | −15 | −15 | −15 | +15 |

MAGNETIC TAPE PLAYBACK UNIT WHICH SEQUENTIALLY SWITCHES BETWEEN FOUR TRACKS BY DETECTING END OF TRACK SILENCE

The invention relates to an apparatus for reproducing of recordings on magnetic tapes containing several tracks and more particularly on magnetic tapes in mini cassettes or on endless-loop cartridge tapes.

Such devices now employed require manual return of the cassette to pass from one track to another, the direction of unravelling of the tape being unchanged. Current devices thus are not appropriate for providing background music in areas such as, for example, large department stores, large open areas, restaurants, cafes, etc. because the repeated and frequent manual intervention required results in personnel interruptions and costs which render the apparatus impractical. The ideal solution is endless sound which does not require intervention and which operates with high reliability.

This solution is provided by the use of an endless single-track magnetic tape, but the problem is that such a tape lacks variety, the same music or message being replayed too frequently. In order to prevent boredom and to diversify the transmission, the tape can be frequently changed. This is a smaller inconvenience than effecting manual return, but still a substantial one.

To remedy this problem it has been proposed to use electromechanical devices generally called "plates," either a two-directional plate for two-track magnetic tape cassettes or a one-directional plate for two-track endless tape cartridges, these plates including a playback head with two heads. In both cases, the changing of tracks is done by changing the head from which the reproduction is derived and in the case of a cassette by also changing the direction of unravelling of the tape. These changes are done either mechanically, the tape arriving at its end, stretching and then shifting a lever activating a switch, or electrically, the tape having a conducting capsule, or else a perforation permitting closing or opening the circuit of a switch. In the two cases, the relays act to change the head and eventually the direction of unravelling. Any track change which begins with the stretching of the tape is unacceptable for continuous operation devices since that tape breaks easily because of the jolt resulting from the abrupt stopping of the tape. Added to this disadvantage is the fragility of the control and the resulting unreliability. The operating costs are then burdened with the cost of frequent breakdowns.

Changing by electrical contact at the end of the tape or at the end of recording, is also to be avoided because of the near-impossibility of replacing one of the recordings by another resulting from the unchanging overlapping of the tape by the contact.

The present invention relates to an apparatus for reproducing recordings on magnetic tape having a number of tracks greater than two and capable of operating in continuous transmission without any manual intervention other than the initial placement of the cassette or the cartridge. This transmitter has entirely electronic control of track selection and reversal of the direction of unravelling.

The invention relates more particularly to a reproducer of the type discussed above containing an attached electronic device termed an "inhibitor" which prevents two successive change-overs during the same silence, which is the time just before a new modulation is detected. This inhibitor is, however, rendered inoperative by a safety device acting at the end of the magnetic tape if it is unwound without the playback head encountering a recording.

Other particulars and advantages of the invention will appear during the course of the description which follows and which, made with reference to attached drawings given by way of non-limiting examples, will easily show how the present invention can be put to use.

DETAILED DESCRIPTION OF THE DRAWINGS

Figure 1:
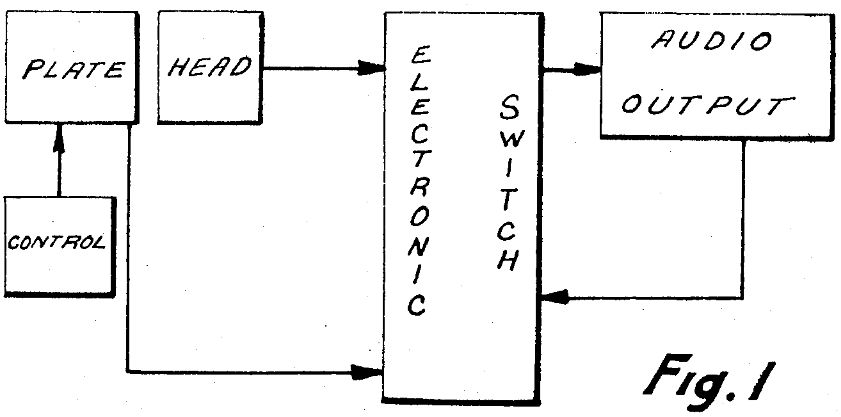
FIG. 1 shows the principal component elements of an apparatus in accordance with the invention.
Figure 6:
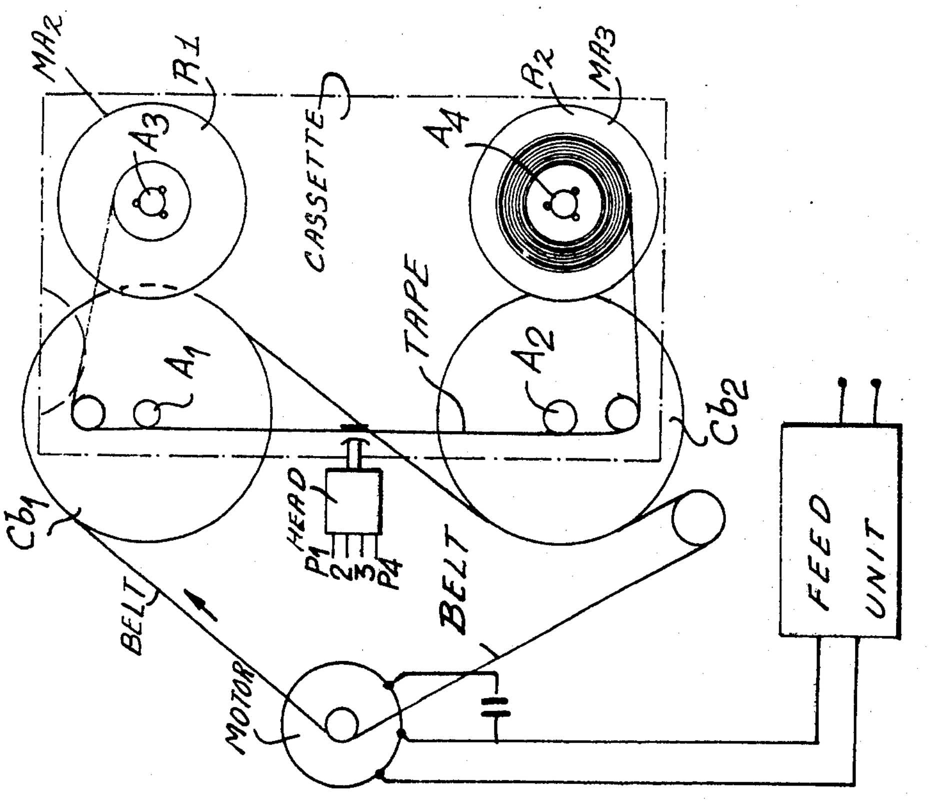
FIGS. 6 and 7 represent a second type of plate having three motors.

The description which follows relates to a reproducer of sound recordings on a magnetic tape in a mini-cassette and containing a number of even tracks greater than 2 (usually a minimum of 4). As can be seen in the block diagram in FIG. 1, this apparatus includes a mechanical plate of known type (either the one which can be seen in FIGS. 2 to 5 or the one shown in FIGS. 6 and 7) causing the magnetic tape to pass in front of a playback head including as many detecting gaps as there are tracks recorded on the tape. The playback head is connected to a conventional audio output device (amplifiers-loudspeakers, etc.) through a static electronic switch. The various functions of the plate are controlled by the control circuit.

In principal the placement of the cassette into the plate produces the initial impulse for starting it on its course. Under certain conditions, however, which will be discussed below, the absence of modulation detected by the audio device causes stopping of the apparatus.

Prior to going into the description of parts concerning the invention it is appropriate to describe the two types of plates which can be used as the mechanical part of this transmitter.

FIGS. 2 to 5 are level-view sketches of the first type of plate according to various horizontal planes superimposed. As can be seen by examining these figures, this plate includes in a frame (not shown) a motor fed and controlled by the general feed unit which is itself connected to a current source, the motor driving always in the same direction, by its pulley and a belt, the two capstans $C_{b1}$ and $C_{b2}$ which turn in a direction opposite to one another about spindles $A_1$ and $A_2$ respectively.

Figures 2, 3:
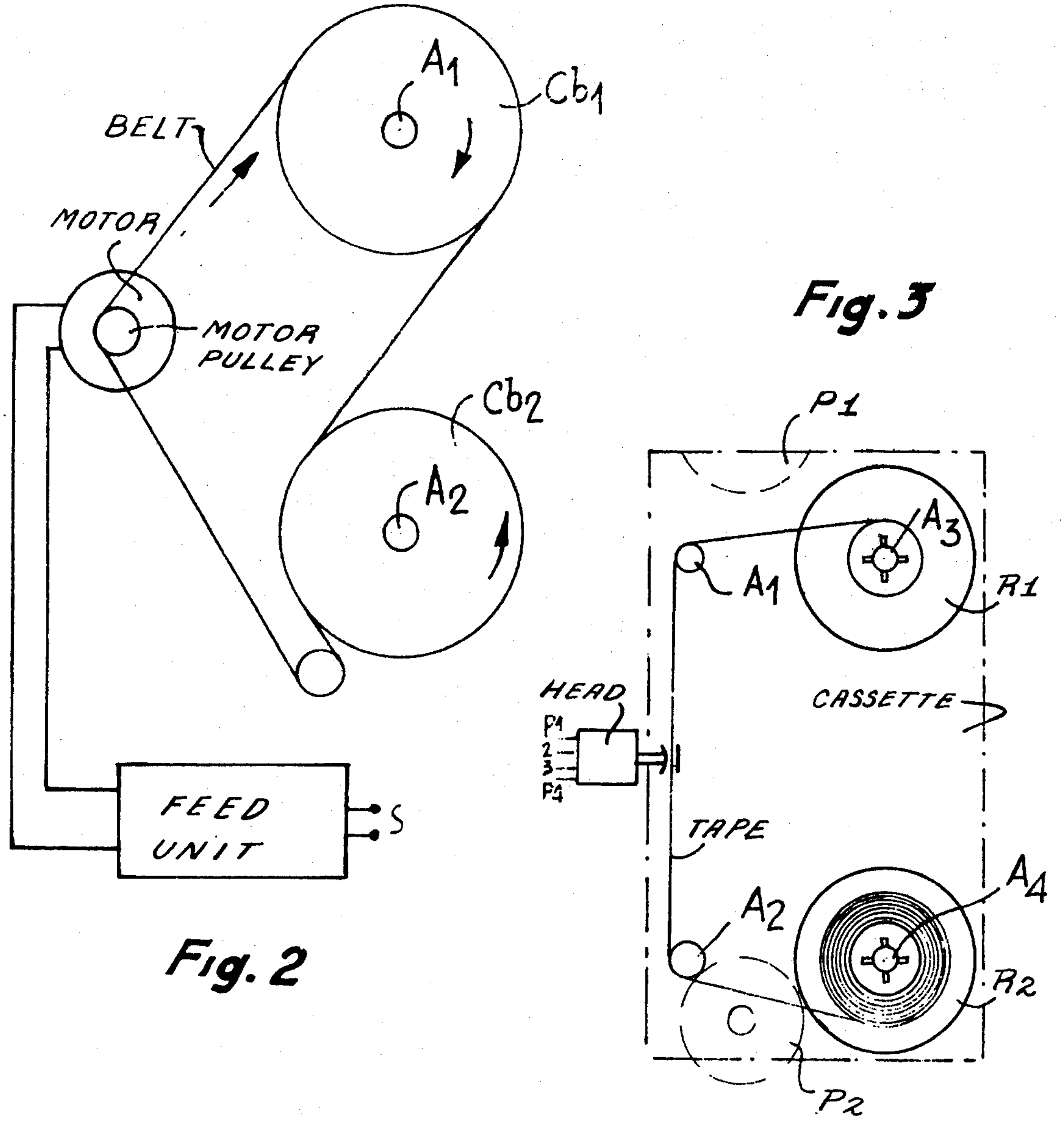
FIGS. 2 to 5 inclusive represent the mechanical part of this apparatus, characterized by one type of Plate.

The spindles (axles) $A_1$ and $A_2$ as shown in FIG. 2 of these capstans are alternately driven to provide the impetus for moving the magnetic tape shown in FIG. 3 in one direction or the other. The ends of this tape are connected to the reels $R_1$ and $R_2$ of a cassette.

Figure 4:
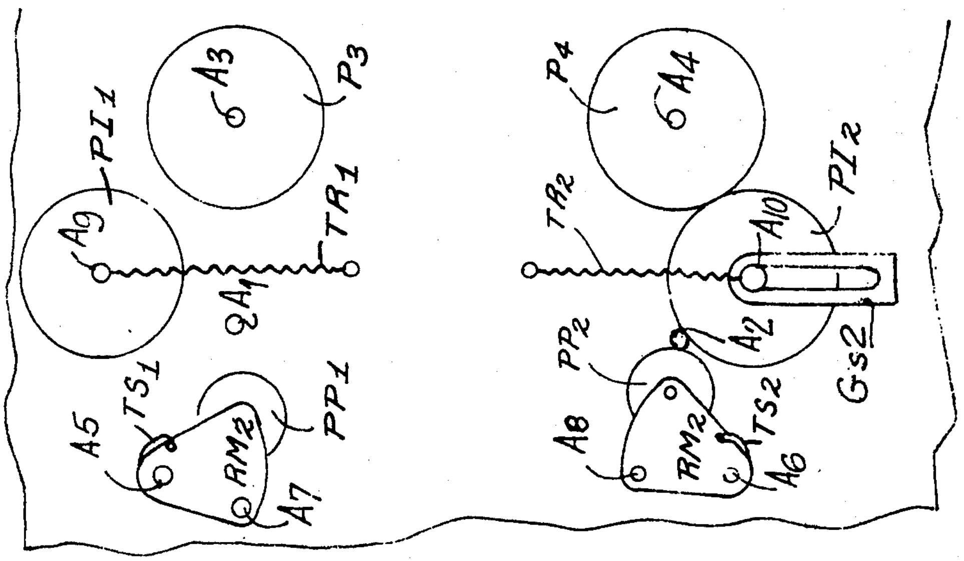

As can be seen in FIG. 3, reels $R_1$ and $R_2$ are carried respectively by spindles $A_3$ and $A_4$ which are in turn mounted on the plate. Spindles $A_3$ and $A_4$ are respectively connected for rotation with pulleys $P_3$ and $P_4$ (shown in FIG. 3) which are alternately driven by pulleys $P_1$ and $P_2$ of FIG. 2. Furthermore, as shown in FIG. 4, the plate supports two rocker members $RM_1$ and $RM_2$ pivoting around the fixed spindles $A_5$ and $A_6$. Pressing pulleys $PP_1$ and $PP_2$ pivot with respect to these rockers. These rocker members are arranged so that the pressing pulley of one of the rockers tightly applies the tape against the spindle $A_1$ or $A_2$ which corresponds when the rocker in question is in its closest position to the cassette. Rocker members $RM_1$ and $RM_2$ also are provided with fingers $A_7$ and $A_8$ respectively, which are removed from the pivoting spindles $A_5$ and $A_6$ and onto which there are wound torsion springs $TS_1$ and $TS_2$ urging each rocker member closer to the position in which its pulley $PP_1$ or $PP_2$ is tangent to the spindle $A_2$ or $A_1$. Intermediate pulleys $PI_2$ and $PI_1$, which drive by friction pulleys $P_3$ and $P_4$, pivot about spindles $A_{10}$ and $A_9$, sliding in grooves $GS_2$ (or $GS_1$ not shown) opposing traction springs $TR_2$ and $TR_1$.

Figure 5:
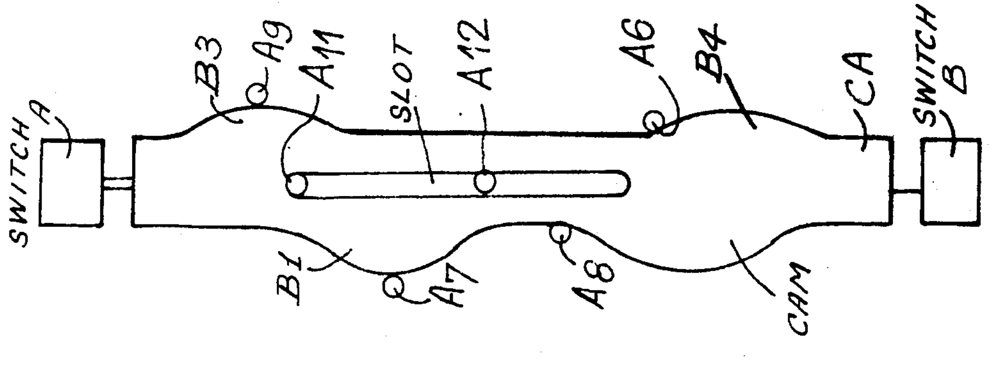

A cam shown in FIG. 5 is alternately shifted in translation by switches A and B guided by fixed spindles $A_{11}$ and $A_{12}$ passing through a slot. This cam has two sets of bosses $B_1$ and $B_2$ and $B_3$ and $B_4$ situated on both sides. The purpose of these bosses is to shift, respectively, the spindles $A_7$-$A_8$ and $A_9$-$A_{10}$ as the cam is itself shifted by switches A and B. In this way the moving of the cam in one of the two directions releases on the one hand one of the rockers by its spindle (for example $A_8$) in the direction of the cassette so as to halt the friction between pulley $PP_2$ and spindle $A_2$ which is driving the tape and on the other hand the spindle of one of the intermediate pulleys (for example $A_{10}$) to suppress the driving of the corresponding reel (for example $R_2$) by this pulley from $A_2$. Thus, there is synchronization of the movement of the one of the devices which is driving the tape and of the corresponding rethreading reel.

As shown in FIG. 3, the tape passes in front of a playback head which includes as many detecting gaps as there are tracks of recording on the tape. Accordingly, for this arrangement we can alternatively use a two-directional plate with three motors of the type shown in FIGS. 6 and 7. As can be seen in these figures, this plate has a fixed chassis and a moving chassis.

The fixed chassis has on the one hand a main motor driving a belt to turn two capstans $Cb_1$ and $Cb_2$, in opposite direction, the respective spindles of which $A_1$ and $A_2$, serve as a drive pulley for the tape and on the other hand two secondary or auxiliary motors $MA_2$ and $MA_3$ each one of which is connected to a reel-carrying spindle $A_3$ or $A_4$. The motors $MA_2$ and $MA_3$ are motors with weak coupling which provide for the perfect rolling up of the tape onto the reel in question. Naturally these motors operate alternately, and their speed is reduced by the tape to a speed corresponding to the movement of the tape. Their action on the reel provides a tension of the tape which is favorable for proper winding.

Figure 7:
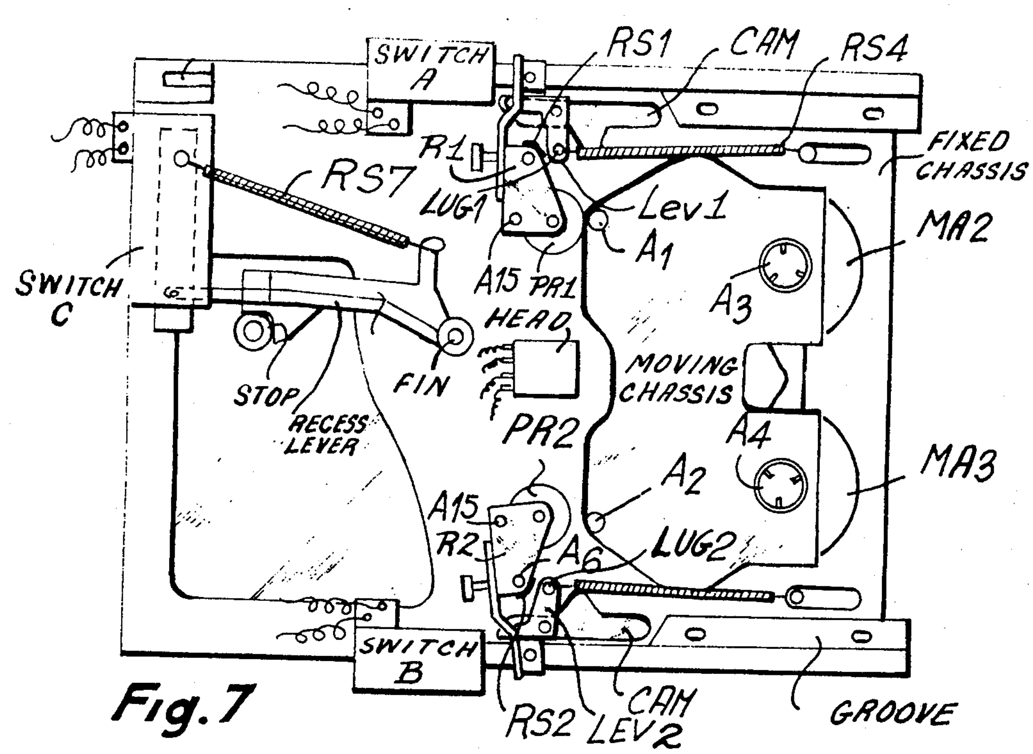

As shown in FIG. 7, the fixed chassis has grooves into which the cassette CS is placed which pushes the Lugs 1 and 2 in opposition to the springs $RS_1$ and $RS_2$ and cause the levers $LEV_1$ and $LEV_2$ to pivot about a spindle (axis) passing through the cam-cutter CAM, this spindle being connected to the moving chassis.

The moving chassis is connected to the fixed chassis by four parallel links (not shown in the drawing) forming with the structures of the chassis a deformable parallelogram such that the plane of the mobile chassis approaches the plane of the fixed chassis by pivoting according to the lower spindles of these links. Springs tend to spread apart the mobile chassis.

The fixed chassis mounts the playback head which is provided with four detecting gaps, the pressure rollers (pulleys) $PR_1$ and $PR_2$ of the rockers $R_1$ and $R_2$ vibrating against the springs $RS_1$ (or $RS_2$) according to their axis $A_{15}$. The magnetic tape passes between the spindle-pulley $A_1$ and the pressing pulley $PR_1$ and between the spindle-pulley $A_2$ and the pressure pulley $PR_2$. Since the spindle $A_1$ is connected to the capstan $Cb_1$ and the spindle $A_2$ is connected to the capstan $Cb_2$, and these two capstans turn in opposite directions, the tape will be driven in one direction or the other according to the couple of pulleys ($A_1/PR_1$ or $A_2/PR_2$) which then work together as the result of the stimulus imparted by one of the switches A or B acting on the rocker member $R_1$ or $R_2$. Further, switch A or switch B is placed under pressure in synchronization with further switch controlling the rotation of the correspnding auxiliary motors $MA_2$ and $MA_3$.

A recess lever is connected on the one hand to the mobile shank in FIN and on the other hand to the mobile shank of a switch (relay) C, a spring $RS_7$ causing the rotation about FIN. At the position in which the two chassis are close to one another, the recess lever engages the STOP. Recess lever and this STOP constitute the locking mechanism, the relay switch C providing the unlocking.

Figure 8:
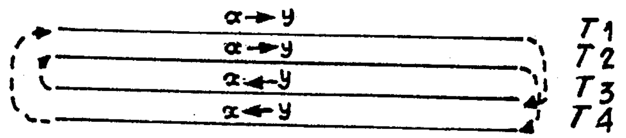
FIG. 8 shows the order of succession of the playbacks of the tracks and the direction of unravelling for each one of them.

The two types of plates which have just been described have not been used up to now except for cassettes with two-track magnetic tapes. The use of tapes having four or more tracks makes it impossible to apply a switch-over by a simple reversal and makes it necessary to use more complicated switching devices. The switching is, however, simplified if a certain order is adopted in the direction of movement of the tracks. FIG. 8 shows the direction of movement of a tape having four tracks, $T_1$, $T_2$, $T_3$ and $T_4$. The first track ($T_1$) and the second track ($T_2$) are read from *x* towards *y* while the third track ($T_3$) and the fourth track ($T_4$) are read from *y* towards *x* although the order of reading is $T_1$-$T_3$-$T_2$-$T_4$-$T_1$, etc.

Figures 11, 12, 13, 14:
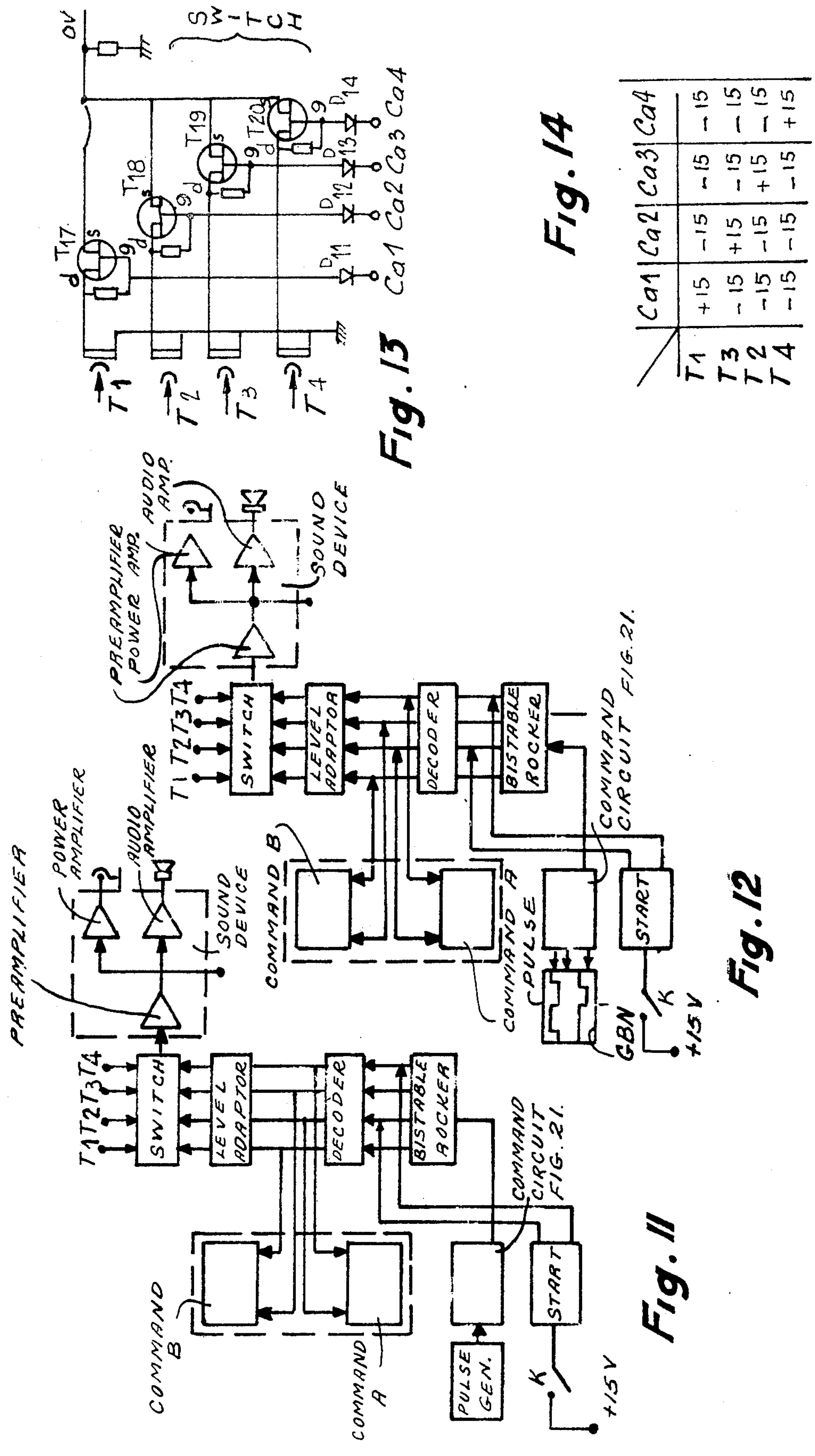
FIG. 11 is a modular drawing of the electronic part of the transmitter reduced to its essential elements.
FIG. 12 is a modular drawing of this same electronic part, the pulse generator being the device represented in FIG. 9.
FIG. 13 is a drawing of the switching device.
FIG. 14 is a table giving the pressures applied at the inputs of the switch when the playback-output connection is established for one of the tracks.
Figure 15:
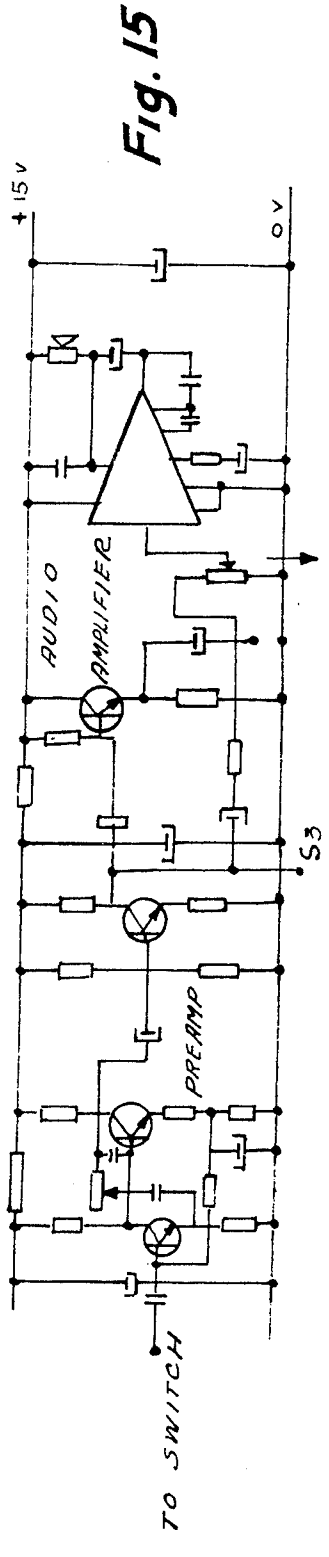
FIG. 15 is a drawing showing the audio amplification circuit and the integrated circuit.

FIGS. 11 and 12 illustrate two similar embodiments of circuitry for providing signals causing the required transfer from one track to the other, and the change in direction of movement of the tape. The Bistable Rocker circuitry which is described in detail below provides an output on one of its four channels or lines, each corresponding to one of the tracks and indicating from which tracks signals should be derived and applied to the Sound Device. The output of the Bistable Rocker circuitry is applied to a Decoder circuitry which provides appropriate signals on its four output lines connected to the output of the Decoder are the two Command Circuits for the relays RA and RB. In the instance where a plate with three motors is employed appropriate control circuits for the relays are RMA and RMB would also be employed for controlling the rotation of the auxiliary motors MA2 and MA3.

The output of the Decoder circuit is also applied to a level adapter circuit which likewise provides four output lines or channels. The output of the Level Adapter Circuit is in turn applied to a Switch which also receives the electrical signals derived from the respective heads for the four tracks. The Switch couples the correct track to the input to the Preamplifier in the Sound Device. The output of the preamplifier is in turn applied to a Power and an Audio Amplifier for driving appropriate loud speakers and the like.

Figure 21:
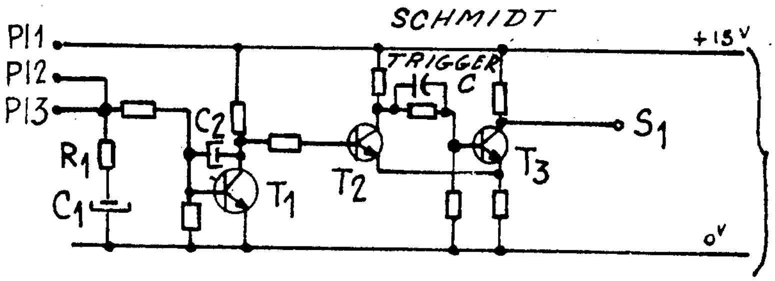
FIG. 21 is a drawing of the control module of the levers.

The shifting of the Bistable Rocker between its four output states is controlled by a Pulse Generator and the Command Circuit which is shown in detail in FIG. 21. The Pulse Generator provides pulses to the command circuit so long as the tape is moving and the command circuit provides an appropriate signal to the Bistable Rocker causing it to change its output condition when the tape stops, indicating that it has reached its end. In order to cause the equipment to start on the same tape and move in the same direction initially, the closing of Switch K by the insertion of a cassette into the equipment operates a Start circuit to impose a signal on the output of the Bistable Rocker which causes track 1 to be played and the tape to move in the direction associated with that track.

All of the circuits or modules shown in FIG. 11 and 12 are of course powered by the feed unit (FIG. 2) which includes in particular the general switch, the rectifier and the transformer or transformers lowering the voltage of the area to that or those which has or have been selected for the transmitter. In the case which is going to be described, we took a positive voltage equal to +15 V, this voltage being the maximum voltage for utilization of the circuit of the sound amplifier and a negative voltage equal to −15 V greater in absolute value than the voltage for which the semi-conductors of the switching device are blocked.

This switch in FIG. 13 has as many basic component switches as there are tracks on the tape. In the case shown in FIG. 13 this switch is composed of four transistors of the field-effect type $T_{17}$, $T_{18}$, $T_{19}$ and $T_{20}$, each one of which is associated with a diode $D_{11}$, $D_{12}$, $D_{13}$ and $D_{14}$. As is well known a field effect transistor FET is a semi-conductor device presenting in its non-conductive state a very high drain-source resistance, and in its conductive state a very low resistance close to 100 ohms so that its characteristic approaches that of a perfect on-off device. In FIG. 13 and in each FET, the drain, the source and the gate are indicated by the letters *d s* and *g*, respectively. The "gate" (input) impedance being an almost infinite $10^6$ ohms (several hundreds of Mohms), the input current zero, the voltage gate drain is zero and gate-source voltage not equal to zero, since a FET has no offset voltage. Consequently, $T_{17}$ is conductive, $R_{DS} \neq 0$ and the signal coming from the corresponding track is transferred to the output.

Summarize, the table in FIG. 14 indicates the track from which the signals are transferred to the output as a function of the voltages existing on the inputs $Ca_1$ $Ca_2$ $Ca_3$ and $Ca_4$ from the level adapter. The semi-conductor of one of these basic switches is rendered conductive by these voltages for switching one of the gaps to the input of the audio stage, the semi-conductors of the other basic switches being non-conductive. The audio circuit includes an audio preamplifier and an audio amplifier of preferably 3 watts, provided with an output capable of handling a conventional external amplifier of high power.

In order to allow the current to pass into one of the FETS of the switch and to block the others, bistable multivibrators or rockers are employed. The Rocker module shown in FIG. 16 has as many bistable rockers or multivibrators as there are component switches, i.e., pairs of magnetic tracks on the tape.

Figure 16:
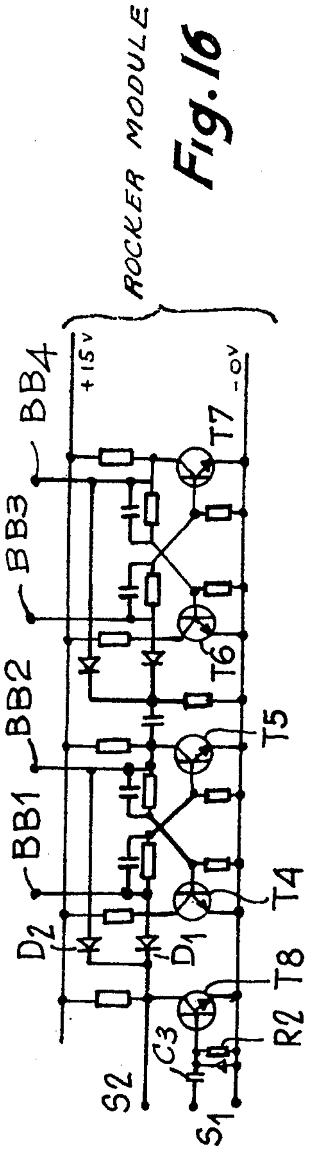
FIG. 16 is a drawing of the "levers" module.

In the circuit which is illustrated in FIG. 16, there are therefore two rockers ($T_4$-$T_5$) and ($T_6$-$T_7$) in series, the first receiving the command signal appearing at $S_1$ through the transistor $T_8$. Each rocker serves as an input to two of the channels, respectively ($Ca_1$ $Ca_2$) and ($CA_3$ $Ca_4$). In a conventional manner T4-T5 and T6-T7 form a bridge.

A bistable rocker has two stable states which complement each other and that in order to change the state it is necessary to provide it with an impulse. If we assume that the transistor $T_4$ is saturated, its collector is at the potential 0 V, the base of $T_5$ is at 0 V and $T_5$ is blocked. Its collector is at +15 V and the voltage base emitter of $T_4$ is greater than 0.7 V so that $T_4$ is saturated. The rocker is well into at stable state. It is the signal of command +15 V arriving at $S_1$ which changes this state. This signal is differentiated by the circuit $C_3R_2$ and for a short moment of time we obtain a positive voltage on the base of the input transistor $T_8$ which becomes saturated. During this moment, the collector of $T_8$ is brought to 0 V. Diode $D_1$ is blocked, since $T_4$ is saturated, and no change in potential is transmitted by this diode. Diode $D_2$, however, becomes conductive and reduces the potential of the collector of $T_5$ to 0 V so that $T_4$ is blocked and $T_5$ becomes saturated. The rocker remains in this position after the disappearance of the command impulse since it is the second stable state.

The second rocker is triggered by the saturation of $T_5$. The negative signal is differentiated and acts in the same manner as the saturation of $T_8$. The signals leaving the rocker module are decoded in a decoding module placed between the rocker module and the switch as shown in FIGS. 11 and 12.

Figure 17:
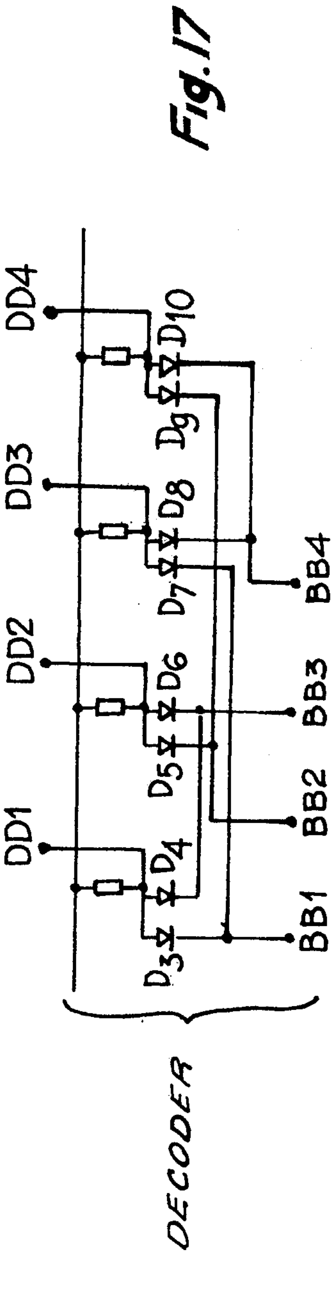
FIG. 17 is a drawing of the decoding device.

The four channels $Ca_1$ $Ca_2$ $Ca_3$ and $Ca_4$ coming out of the outputs $BB_1$, $BB_2$, $BB_3$, $BB_4$ of the rocker module enter into the decoding device shown in detail in FIG. 17 and leave it by the outputs $DD_1$, $DD_2$, $DD_3$ and $DD_4$. This decoding device on the line +15 V contains, distributed on each of the channels, the four pairs of diodes $D_3$, $D_4$, $D_5$, $D_6$, $D_7$, $D_8$ and $D_9$, $D_{10}$ of identical operation.

For example, for the pair $D_3D_4$ the signals are to be considering arriving at $BB_1$ and $BB_3$ which vary from the value 0V to +15 V, and consequently, the following four cases can occur:

| | 1st case | 2nd case | 3rd case | 4th case |
|---|---|---|---|---|
| $BB_1$ | O V | O V | + 15 V | + 15 V |
| $BB_3$ | O V | + 15 V | 0 V | + 15 V |

Figure 18:
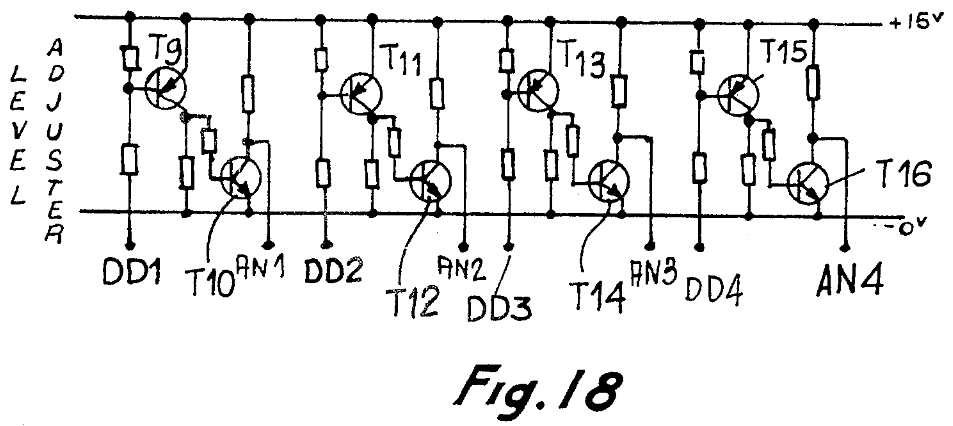
FIG. 18 is a drawing of the level adjustment device.

If we compare this table to the one in FIG. 14, we see that it is necessary to change the level 0V. To do this, the level adjuster device shown in detail in FIG. 18 is connected to the lines +15 V, −15 V, so that the level adjuster follows the decoding device. This device transposes a level varying from 0 to 15 V existing at its inputs $DD_1$-$DD_2$-$DD_3$-$DD_4$ into levels varying from −15 V to +15 V without inversion of the Boolean significance in $DD_1/AN_1$, $DD_2/AN_2$, $DD_3/AN_3$ and $DD_4/AN_4$. Each input, such as $DD_1$, is connected to its corresponding output, such as $AN_1$ by the set of two transistors, such as $T_9T_{10}$ and the operation occurs as follows. If the potential $VDD_1$ = + 15 V, the base of $T_9$ is at +15 V, the voltage base-emitter is zero and the transistor $T_9$ is blocked. The collector is at −15 V, therefore the base of $T_{10}$ is at −15 V. The base-emitter voltage of this transistor is therefore zero and the transistor $T_{10}$ is blocked. Consequently the potential $VAN_1$ = +15 V. If $VDD_1$ = 0 V, the base-emitter voltage of the transistor $T_9$ is greater than 0.7 V, this transistor is saturated and its collector is at +15 V. The base-emitter voltage of $T_{10}$ is greater than 0.7 V. Thus, this transistor is saturated and the potential $VAN_1$ = −15 V.

The functioning is identical for $DD_2/AN_2$ with the transistors $T_{11}$-$T_{12}$, for $DD_3/AN_3$ with the transistors $T_{13}$-$T_{14}$ and for $DD_4/AN_4$ with the transistors $T_{15}$, $T_{16}$. The signals coming from $AN_1$, $AN_2$, $AN_3$, $AN_4$ enter into the switching device which couples one of the tracks to the output which constitutes the input of the audio preamplifier. The level adjuster is necessary in this embodiment because the module of rocker is fed with +15 V/0 V.

Figure 19:
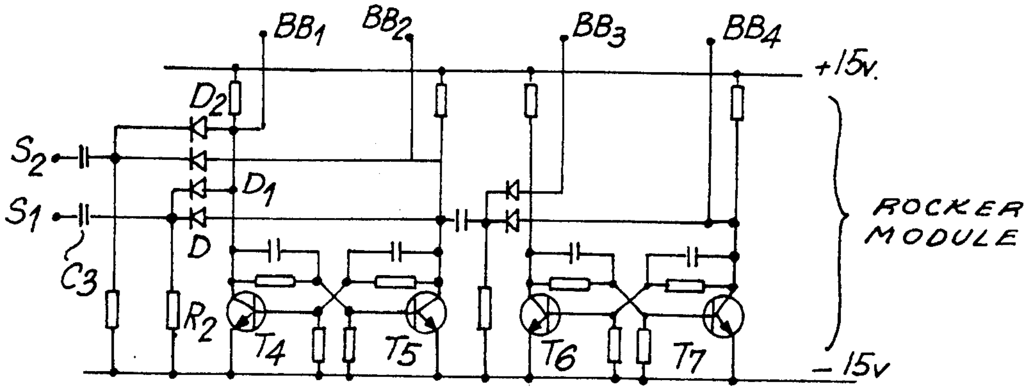
FIG. 19 is a drawing showing a variation of the levers module.

FIG. 19 illustrates a module comprising a variation of the rocker module, but supplied in +15 V/−15 V. The makeup of the module of FIG. 19 is similar to that in FIG. 16. If we assume that the transistor $T_4$ is saturated, its collector is at the potential +15 V. The base-emitter voltage of $T_4$ is greater than 0.7 V, so that $T_4$ is saturated. The rocker is well into a stable state. It is the command signal +15 V arriving at $S_1$ which changes this state. This signal is differentiated by the circuit $C_3R_2$.

Figure 20:
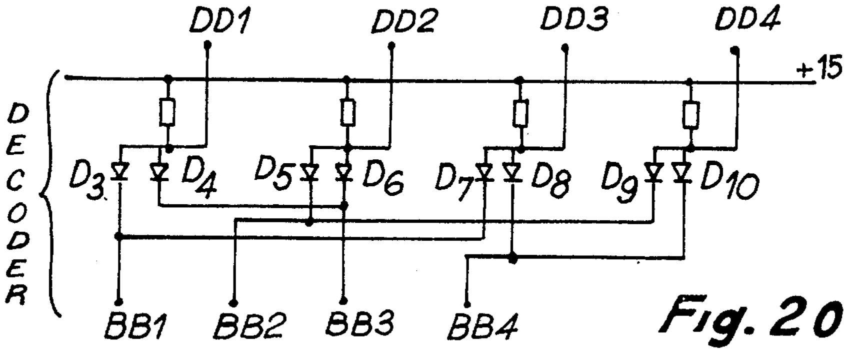
FIG. 20 is a drawing of the decoding device following this variation.

When $T_8$ is saturated its collector is brought to −15 V, the diode $D_1$ is blocked because $T_4$ is saturated and no change in potential is transmitted by this diode. Diode $D_2$, however, becomes conducting and brings the potential of the collector of $T_5$ to −15 V so that $T_4$ is blocked and $T_5$ is saturated. The whole remains in this position after the disappearance of the command impulse, since this is the second stable state. The second rocker is released by the saturation of $T_5$. The negative signal is differentiated and acts in the same manner as the saturation of $T_8$. The four channels $Ca_1$-$CA_2$-$Ca_3$-$Ca_4$ coming from the rocker module of FIG. 19 by the outputs $BB_1$ $BB_2$ $BB_3$ $BB_4$ enter the decoding device shown in FIG. 20 and leave it respectively at $DD_1$, $DD_2$, $DD_3$, and $DD_4$. The decoding device of FIG. 20 on the line +15 V has, distributed on each one of the channels, the four pairs of diodes $D_3$ $D_4$, $D_5$ $D_6$, $D_7$ $D_8$ and $D_9$ $D_{10}$ whose functioning is identical. For example for the pair $D_3D_4$ consider the signals arriving at $BB_1$ and $BB_3$ which vary from −15 V to +15 V. Consequently the following four cases can occur:

| | 1st case | 2nd case | 3rd case | 4th case |
|---|---|---|---|---|
| $BB_1$ | −15 V | −15 V | + 15 V | + 15 V |
| $BB_3$ | −15 V | +15 V | − 15 V | + 15 V |

In contrast to the case of the preceding modules, in this new case there is no need for the level adjuster since a negative front on $S_1$ or $S_2$ positions $T_4$ and $T_5$. As we see, the problem of the switching poses the problem of the change of stable state of the rockers by an impulse received by them.

This impulse can be originated by the abrupt closing of a circuit, this closing obtained by conventional methods such as the presence of a conducting path on the tape or of a perforation making it possible to create an electrical contact. Any device can also be used which is sensitive to the mechanical pressure of the tape at the time when it reaches the end of its path.

Nevertheless, it is desirable to avoid any marking whatsoever on the magnetic tape in such a way as to remain free from the length of the replacement recordings after erasure, as well as to avoid the intervention of moving mechanical elements since the functioning of this kind of elements is not safe enough to assure permanent service without risk.

Figures 9, 10:
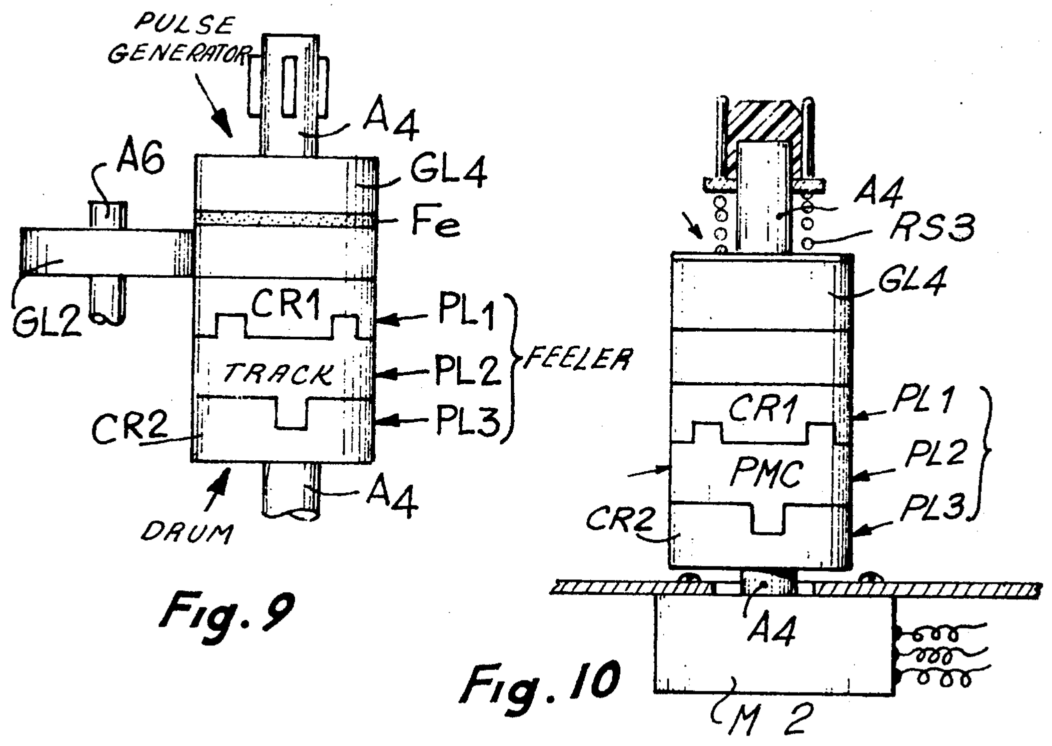
FIGS. 9 and 10 are views of electromechanical means which can act on the switch for changing tracks.

Since as a rule the initial impulse is transmitted to the rockers by means of a command module as shown in FIG. 11 and FIG. 12, it is advantageous to use a pulse generator of the type shown in FIGS. 9 and 10.

THe pulse generator shown in FIG. 9 has a drum which is connected to the spindle $A_4$ for winding the reel. This drum has an endless conducting track of variable length and equipped for example with recesses or notches. Against this drum there rub the three diagrammatically illustrated branches $PL_1$, $PL_2$, $PL_3$ of a feeler. These branches being arranged so that the central branch $PL_2$ is always in contact with the median axis of the track whereas the side branches rub either on the areas $CR_1$ or $CR_2$ of the drum, external to the track, or on the outgrowths of it. FIG. 12 is a sketch in which the pulse generator is the one which has just been described referring to FIG. 10.

FIG. 21 is a detailed diagram of the command circuit of FIG. 12 which provides one output when the tape is moving and a second when it is stopped. This circuit, interposed with capacitances and resistances between the conducting feelers $PL_1$, $PL_2$, and $PL_3$ of the pulse generator and the polarities +15 V and 0 V, is constucted essentially of a transistor $T_1$ combined with a Schmitt trigger $T_2$-$T_3$ with output $S_1$ towards the rockers. When the two feelers $PL_1$ and $PL_2$ are connected, the capacitor $C_1$ is charged to 15 V through the resistance $R_1$ and remains charged when the feeler $PL_2$ is alone on the metalized track. When $PL_2$ and $PL_3$ are connected, $C_1$ discharges in the base circuit of the transistor T which becomes saturated, whereas its collector is at 0 V. Then, when $PL_2$ is alone again, $T_1$ is blocked, but by the capacitor $C_2$ located between its collector and its base, the voltage at the collector rises very slowly. Then $PL_1$ and $PL_2$ are connected again and the above steps repeated. During this time, the Schmitt Trigger $T_2T_3$ during each cycle converts the slow change in potential of the collector of $T_1$ into an abrupt change from 0 V to +15 V. The interval between two saturations does not present any problem since the capacitor C in the Schmitt Trigger has a value such that the time constant is very long in front of that interval. When the magnetic tape is blocked its tracks are fixed and stopped. If $PL_2$ is alone connected then $T_1$ is blocked. If $PL_1$ and $PL_2$ are connected then $T_1$ is blocked and the capacitor $C_1$ remains charged at +15 V. If $PL_2$ and $PL_3$ are connected then $C_1$ discharges into $T_1$ which is blocked when this capacitor is discharged.

Therefore regardless of the relative positions of the feelers $PL_1$, $PL_2$ and $PL_3$, $T_1$ is non-conductive. The potential at the collector rises slowly towards +15 V and when the threshold of the trigger is attained, then the output $S_1$ passes abruptly from 0 to +15 V and acts on the rockers. When the driving spindle $A_4$ of the tape turns again, then $T_1$ is saturated and $S_1$ returns quickly from +15 V to 0 V. It has been stated previously that these changes in voltage constitute the modifying signal of the steady state of the rockers and therefore cause the track change.

Figure 22:
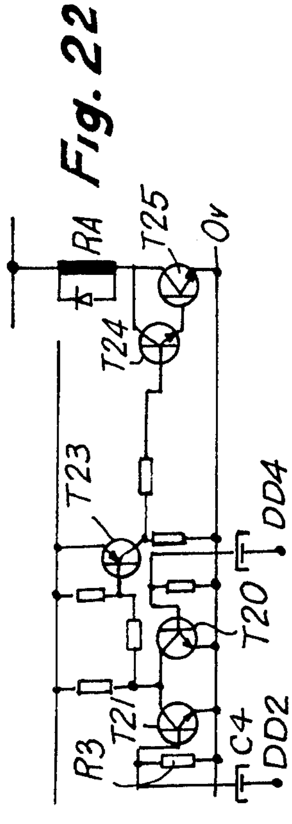
FIGS. 22 and 23 are, respectively, drawings of the switch control devices producing the change in the direction of unravelling of the tape in the case of the plate described with regard to FIGS. 2 to 5.

In the case of a cassette with many tracks, since it is necessary to reverse the direction of movement at the same time that the track is changed, the command devices A (FIG. 22) and B (FIG. 23) of the relays RA and RB causing the translation of the cam are connected to the output of the decoding device. The command device A of FIG. 22 is connected to output $DD_2$ and $DD_4$ of the decoder. Two transistors $T_{21}$ and $T_{22}$ form a logical OR, i.e. the command by $DD_2$ or $DD_4$ activates the relay RA which functions under −24 V. A third transistor $T_{23}$ reverses the signal available on the collectors of $T_{21}$ and $T_{22}$ whereas two other transistors $T_{24}$ and $T_{25}$ form a Darlington stage of high gain in current and feedback.

In what follows we will only describe the command by $DD_2$. To pass from track $T_1$ to track $T_3$, $DD_2$ passes from 0 to +15 V. This passage is differentiated by the circuit $C_4$-$R_3$ and therefore causes a positive pulse on the base of $T_{21}$ which thus saturates during the duration of this pulse.

Figure 23:
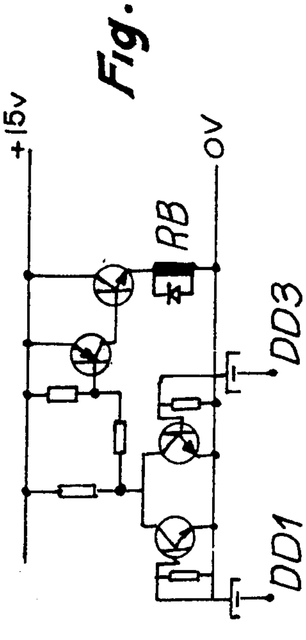
Figure 24:
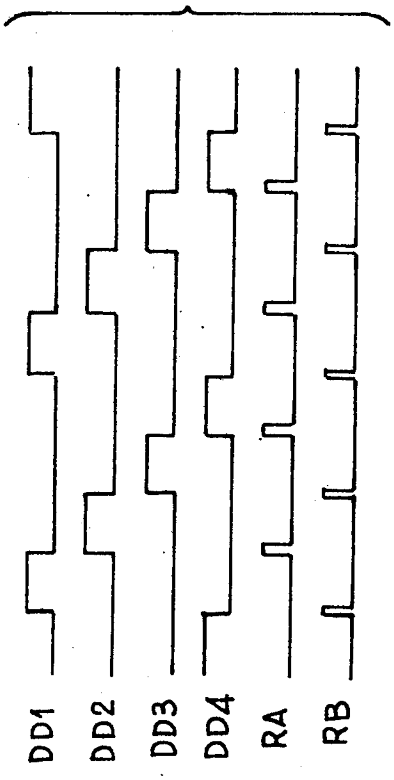
FIG. 24 is an operating diagram of the switch controls.

The transistor $T_{23}$ is also saturated during this pulse and saturates the Darlington pair $T_{24}$-$T_{25}$. The relay RA therefore has 24 V at its extremities and is activated during this pulse which lasts 100 msec, the time necessary for the response of the mechanics activated by the relay RA. The command device B of FIG. 23 is connected to $DD_1$ and $DD_3$ and only differs from the preceding one by the relay RB operating under a voltage of +15 V and a pulse duration of 10 msec. The connection is not "Darlington" but "Compound." The operation of the two relays RA and RB resulting from the voltage pulses occurring at $DD_1$, $DD_2$, $DD_3$ and $DD_4$ is summarized diagrammatically in the diagram of FIG. 24.

Figure 25:
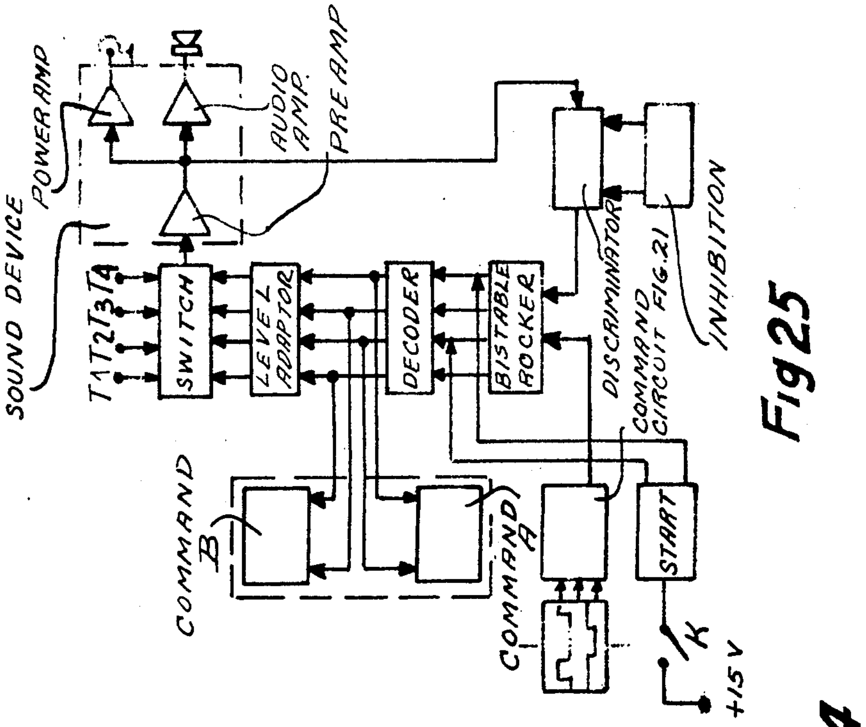
FIG. 25 is a drawing of the electronic part when the generating pulse finds its origin in a modulation command to the output of an amplifier of the sound circuit.

If we wish to eliminate any constraint, it seems necessary to seek out the origin of the pulse in the absence of modulation at the output of the preamplifier. The diagram of FIG. 25 illustrates this principle. The rockers are connected then to this output through a discriminator which operates as a comparator of the time of silence.

Figure 26:
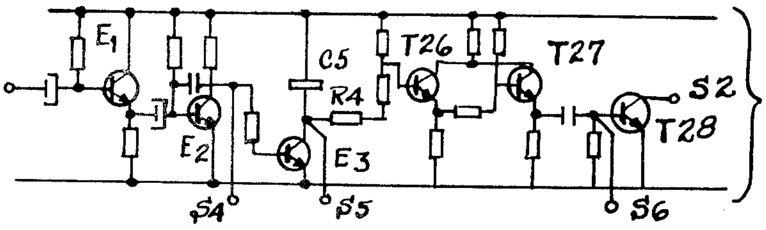
FIG. 26 is a drawing of a circuit discriminating two lengths of time of absence of modulation, permitting the levers to receive the control pulse from an absence of modulation noted at the output of one of the audio amplifiers.

FIG. 26 shows the diagram of the circuits of this discriminator which has the purpose of discriminating the short periods of silence between the signals recorded on a track from long period of silence at the end of a recording and to use this long silence to trigger the pulse for changing tracks.

This discriminator is composed of several stages: $E_1$ is an impedance adaptor with the gain in voltage G=1; $E_2$ is an amplifier saturated in the absence of signal. When the signal is present at $S_3$ (signal preamp signals) the negative part of this signal blocks $B_2$ and $S_4$ is then at +15 V.

Figure 27:
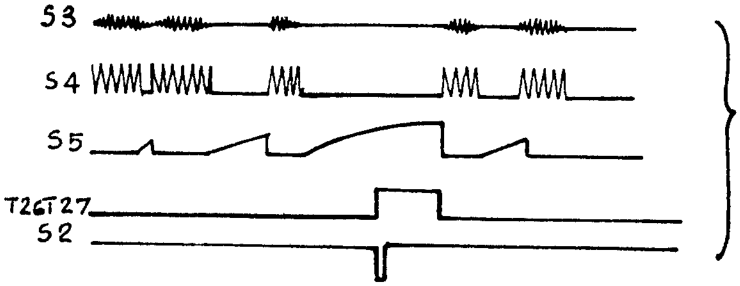
FIG. 27 is a drawing showing operation of this discriminating device.

The third stage $E_3$ is blocked when $S_4$ is at 0 V and is saturated for $S_4$ at +15 V. At the time of a blocking of $B_3$, capacitor $C_5$ discharges into the base circuit of a trigger $T_{26}$- $T_{27}$ with a time constant which is variable by the adjustable resistance $R_4$. When the signal at the base of $T_{26}$ is equal to the threshold of the trigger, then $T_{27}$ saturates and its collector voltage goes abruptly from 0 to +15 V. This rising front is differentiated and saturates a transistor $T_{28}$ mounted in parallel to the input transistor $T_8$ of the module of the rockers. The last two transistors therefore form a logical OR. The saturation of $T_{28}$ therefore causes the track to change. The threshold of the trigger is such that a silence of time $T_1$ adjustable from 5 to 8 seconds produces the changing of tracks. A smaller silence time has no effect. It should be noted that the command module of the rockers described previously becomes a module of safety for switching for the case when, for example, one of the tracks is blank. The diagram in FIG. 27 shows graphically what has been described above.

Figure 28:
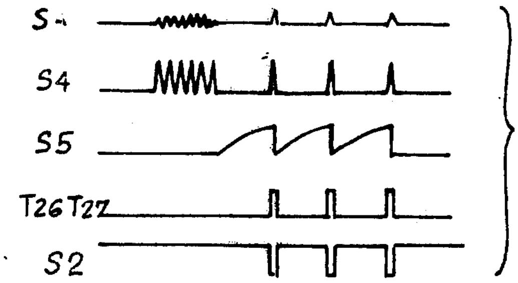
FIG. 28 shows the abrupt change in pressure noticed at the time of the switching to the gate of the TEC.

The main difficulty of the switch-over by means of field effect transistors (FET) resides in the sudden change in voltage on the gate of this type of transistor at the time of the switch-over (see diagram in FIG. 28). The gate-source capacity of a FET differentiates this variation and we thus obtain a pulse which is amplified and acts as a signal to substrate the stage $E_3$ of the discriminator module. Since there is always a period of silence between the switching and the arrival of the next signal on the track we once again reach the threshold of the trigger and we switch over again. FIG. 28 is the diagram of this defect. It is therefore necessary to prevent two successive switchovers during the same silence. This is obtained by requiring the passage of a new modulation to permit the second switching.

Figure 29:
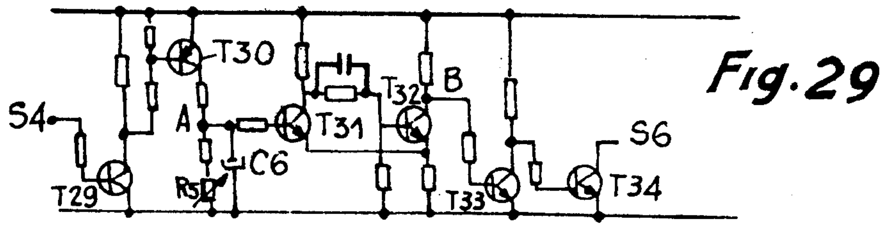
FIG. 29 is a drawing of the circuit inhibiting the changing of track.

FIG. 29 illustrates the inhibition device of the rockers. This device is essentially composed of a Schmitt Trigger $T_{31}$-$T_{32}$ interposed between two pairs of transistors in series $T_{29}$-$T_{30}$ and $T_{33}$-$T_{34}$.

Figure 30:
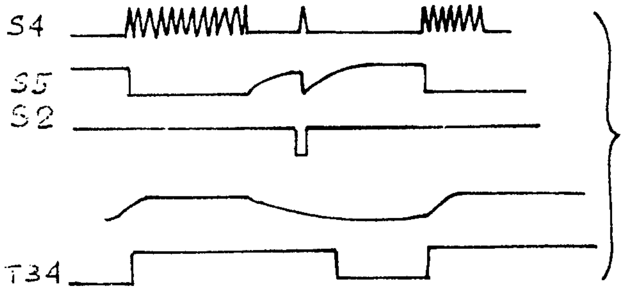
FIG. 30 is a graph of operation of the latter circuit.

When $S_4$ is at 0 V then the transistors $T_{29}$ and $T_{30}$ are blocked, and the capacitor $C_6$ is discharged. The point B of the Schmitt Trigger is at 0 V, the transistor $T_{33}$ is blocked and $T_{34}$ is saturated and places the base of the transistor $T_{28}$ of the discriminator at 0 V, which blocks it. The switch-over cannot occur. When $S_4$ is at +15 V, then the transistors $T_{29}$ and $T_{30}$ are saturated, and the capacitor $C_6$ charges with a time constant $T_{33}$ fixed at 3 seconds. The trigger switches and $T_{34}$ is blocked so that switching can occur. When $S_4$ passes again to 0 V, then the capacitor $C_6$ discharges into the Trigger so that $T_{34}$ saturates after a time $$\Delta T_2 = \frac{3}{2} \Delta T_1$$

and which is varied by means of the adjustable resistance $R_S$. At the end of the time $\Delta T_1$ when $S_4$ is at 0 V the switch-over occurs. However, owing to the fact that $\Delta T_3 = 3_S$ and because of the small duration of the parasite, the capacitor $C_6$ does not have the time to recharge itself. At the end of the time ½ $\Delta T_1$, $T_{34}$ saturates and prevents the new switching. A signal time of $\Delta T_3$ is therefore necessary to once again permit the switching. The operation which has just been described above is illustrated by the diagram in FIG. 30.

Figure 31:
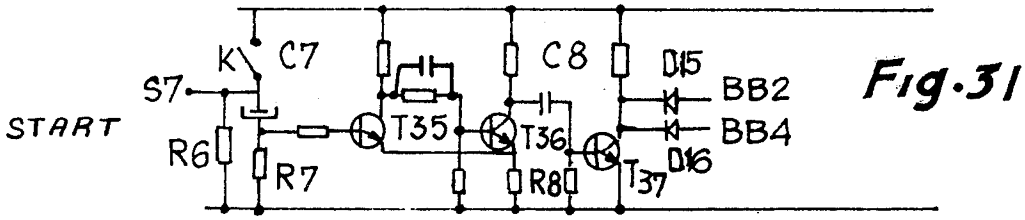
FIG. 31 is a drawing of a circuit assigning the first track when the cassette is put into place.

Finally it is necessary that the introduction of the cassette into the plate causing selection of the same one of the tracks for example track no. 1, with the same direction of movement. For this purpose, the transmitter has an additional start module. FIG. 31 illustrates this module which has the task of forcing the initial direction of movement by imposing a signal on the outputs of the rocker circuits. It contains essentially a Trigger $T_{35}$ $T_{36}$ and a transistor $T_{37}$ and two diodes $D_{15}$ $D_{16}$ on the side of the rockers. The operation occurs as follows.

Figure 32:
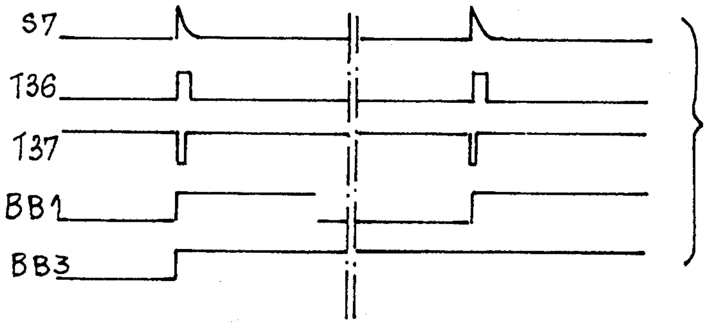
FIG. 32 is a drawing of operation of the latter circuit.
Figure 33:
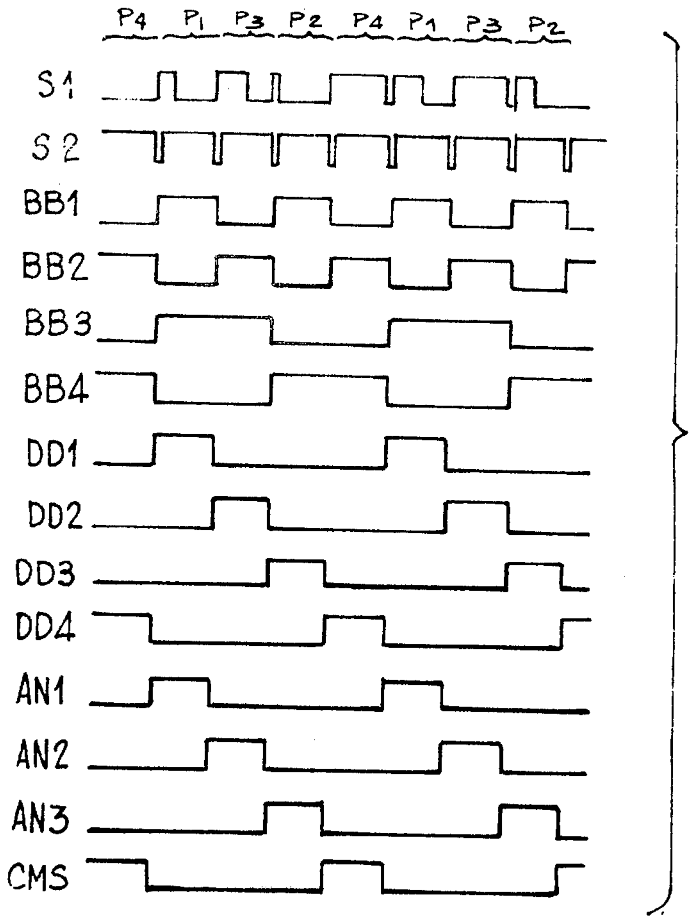
FIG. 33 is a drawing of combined operation of the levers, decoding device, level adjuster and switching device.

When the cassette is introduced, a contact K closes and charges capacitor $C_7$ which discharges almost instanteously into the Schmitt Trigger and into the two resistances $R_6$ $R_7$. The resulting positive pulse is shaped by the Schmitt Trigger and its positive side is differentiated by the circuit with time constant $C_8$ $R_8$. This positive pulse saturates the transistor $T_{37}$ and the two diodes $D_{15}$ $D_{16}$, imposing 0 V at the outputs $BB_2$ and $BB_4$. Consequently the outputs $BB_1$ and $BB_3$ are at +15 V and the passage onto track 1 is imposed. The diagram in FIG. 32 illustrates this procedure of operation resulting from the insertion of the cassette. The operation of the rocker, decoder, level adaptor and switch modules is according to the overall diagram in FIG. 33.

Figure 35:
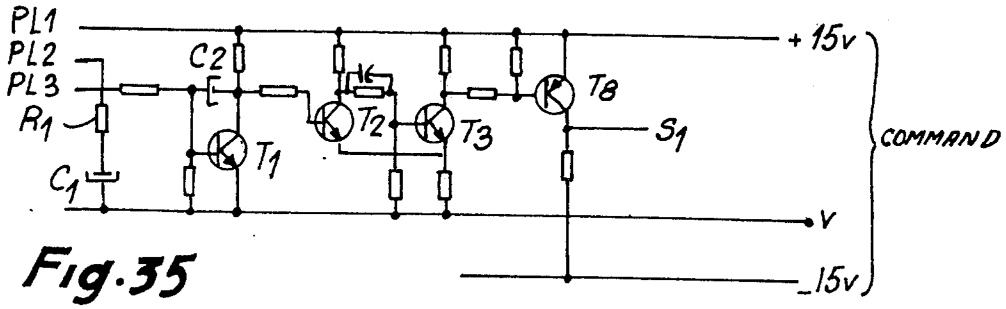
FIGS. 35–36, 37–38 and 39 are, respectively, drawings of the modules: control of levers, discriminator and inhibitor, first track selector proper to the sketch in FIG. 34.
Figure 36:
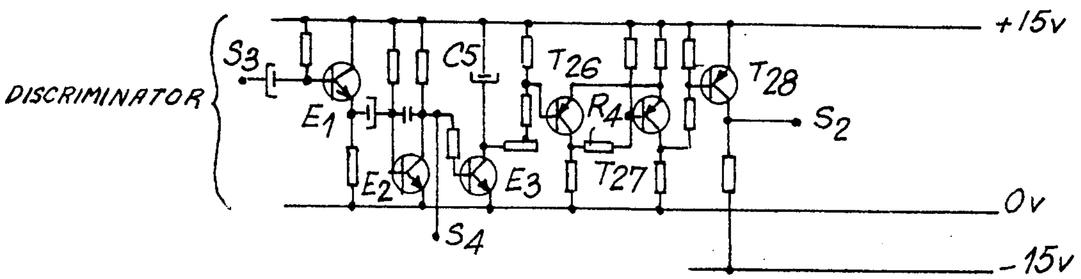
Figure 34:
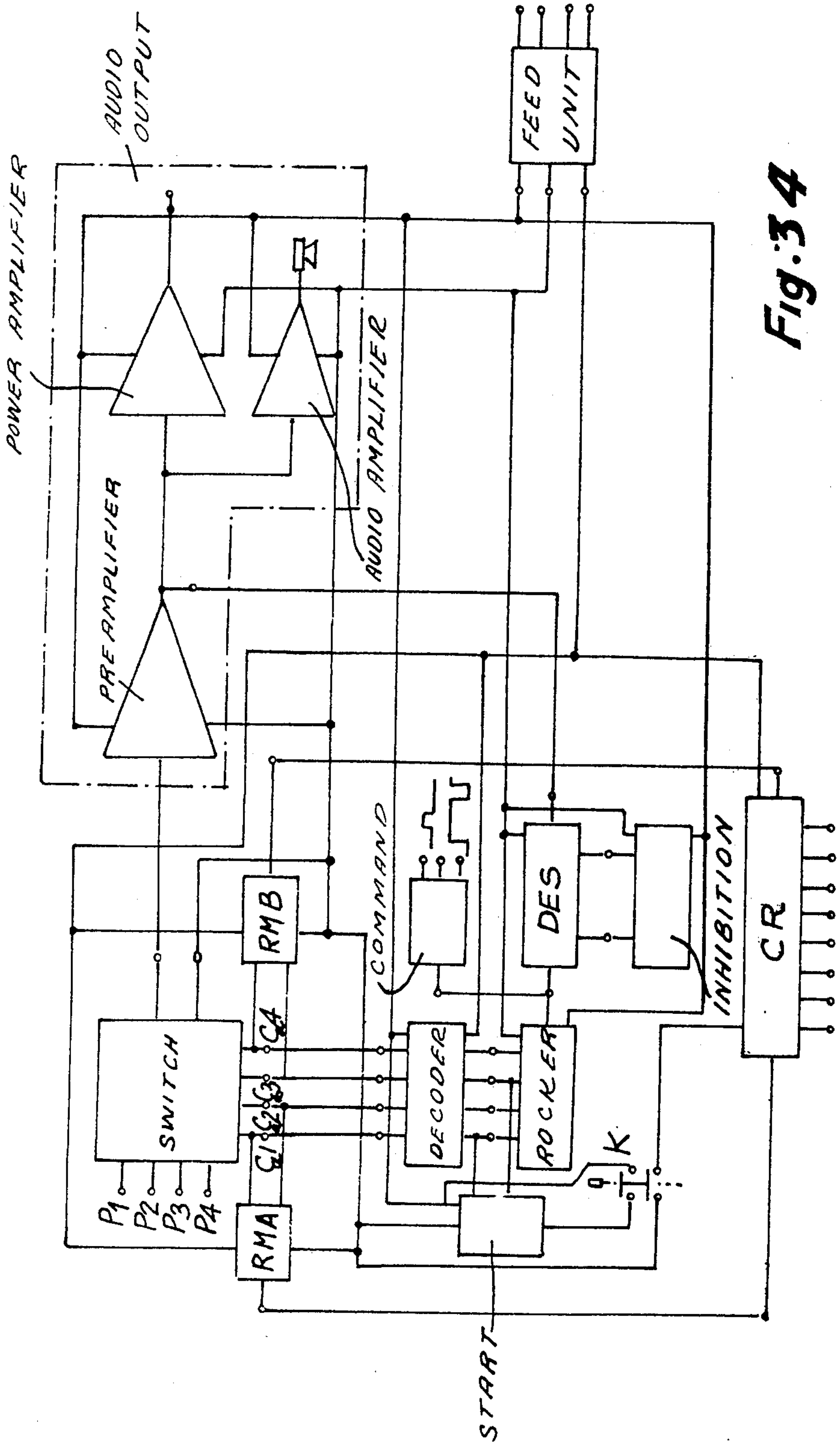
FIG. 34 is a drawing of the electronic part not including a sound level module.
Figure 37:
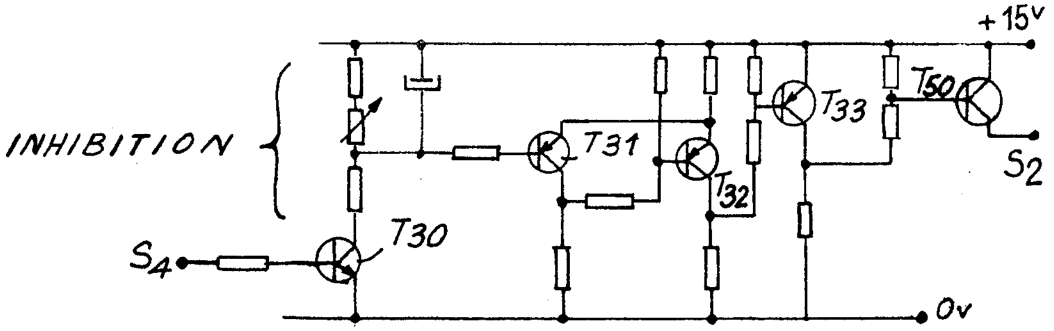
Figure 38:
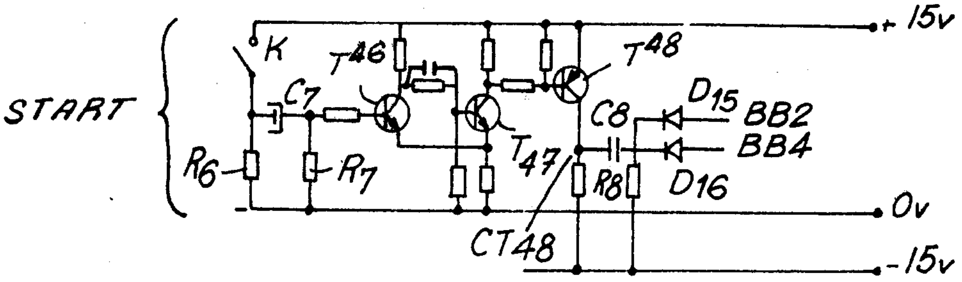

FIG. 34 is a modular diagram of the electronic part of a transmitter which does not require level adjustment. As we can see by comparing FIG. 21 and FIG. 35, the two devices for commanding the rockers only differ in the position of the transistor $T_8$ the collector of which (FIG. 35) is connected to the line +15 V and the emitter to the line −15 V. The output $S_1$ fluctuates therefore between −15 V and +15 V and vice versa.

If we then compare FIG. 16 and FIG. 19, we notice that the two devices of rockers only differ by the fact that the voltages are +15 V and 0 V for the one rocker and +15 V and −15 V for the other.

Figure 39:
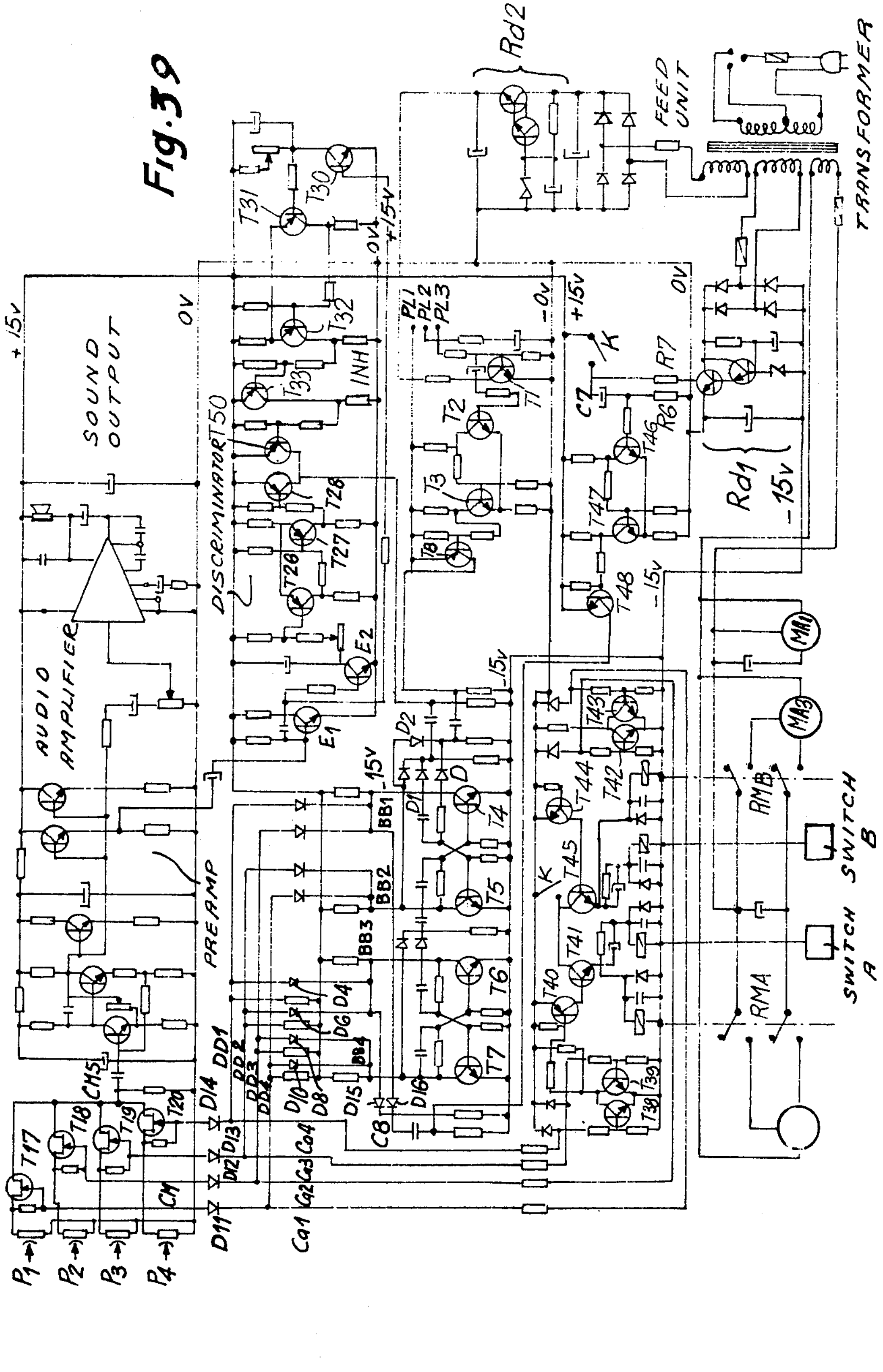
Figure 40:
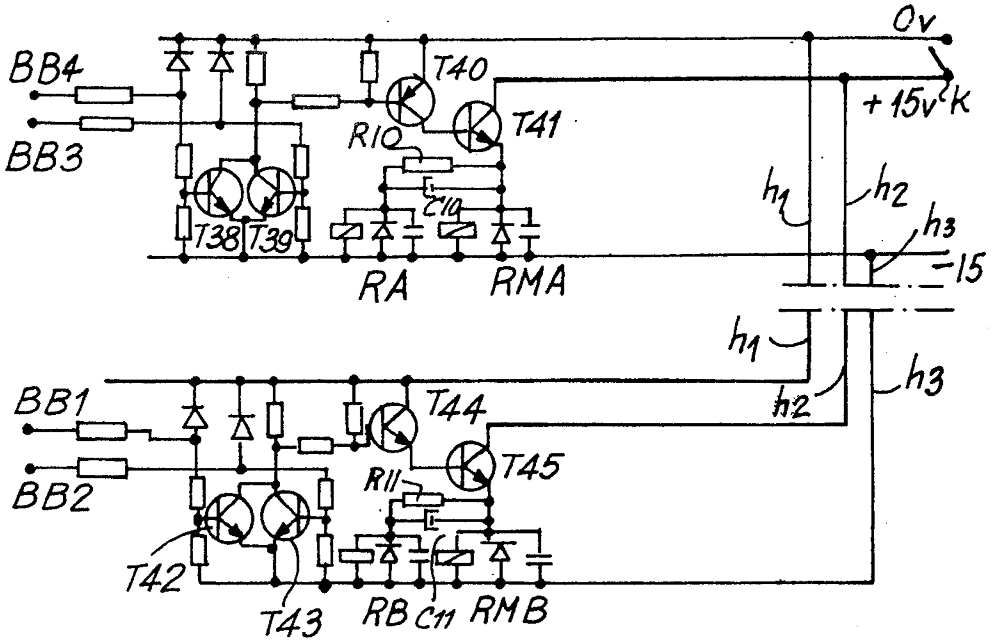
FIG. 40 is a drawing of the control of switches of the plate with three motors.
Figure 41:
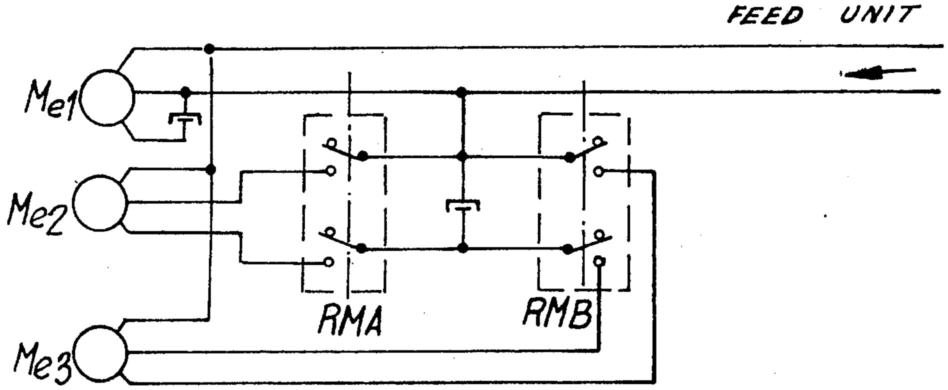
FIG. 41 is a drawing of the connections of these three motors.

As stated previously, the use of a plate with three motors (FIG. 6 and 7) requires a few changes in the circuit, according to the diagram in FIG. 34, as regards the supplying of the relays RA and RB and above all that of the relays RMA and RMB. This modification is shown in FIGS. 40 and 41. FIG. 39 is a complete diagram of a transmitter-reproducer according to the invention and including this plate. The dual feed voltage supply unit receives, from a general switch, the alternating current of the main transformer and includes a general transformer supplying low A.C. voltage to the motors $MA_1$ $MA_2$ and $MA_3$ and two rectifier units providing the D.C. voltages +15 and −15 V. From the time of the engaging of this general switch, the motor $MA_1$ starts out and this causes the capstans $Cb_1$ $Cb_2$ to turn. The insertion of the cassette into the grooves moves the pusher from the switch K.

As we can see in FIGS. 39 and 40, not only does this switch K act on the start circuit, but it also controls the command circuits of two pairs of relays RA-RMA and RB-RMB connected respectively, to the channels $Ca_1$-$Ca_2$ (tracks $T_1$-$T_2$) and $Ca_3$-$Ca_4$ (tracks $T_3$-$T_4$). Because of the relationships between $BB_1$, $BB_2$, $BB_3$ and $BB_4$, only one of these 4 inputs is at +15 V. Therefore, it suffices to analyze the part $BB_3$-$BB_4$ in order to understand $BB_1$-$BB_2$.

$BB_3$ OR $BB_4$ = +15 V therefore $T_{39}$ OR $T_{38}$ are then saturated $T_{40}$ saturated therefore $T_{41}$ saturated therefore PMA feeds and applies the voltage to the motor $MA_2$. $T_{40}$ is saturated and hence $T_{41}$ is saturated. At the moment of the saturation of $T_{41}$, $C_{10}$ is not charged and is therefore equivalent to a short circuit. Hence $R_{10}$ does not act and RA, fed at 15 V, is called up and activates the corresponding rocker.

At the end of a time equal to $\Delta T = R_{10} C_{10}$, the capacitor $C_{10}$ is charged and is equivalent to an open circuit. Hence, $R_{10}$ is connected and limits the current in the relays RA to a current equal to its maintenance current. When the cassette is not inserted then the switch K is open, the device for controlling the relays is not supplied, none of the motors $MA_2$ $MA_3$ turns and no pulley presses the tape between a capstan spindle. This situation is also the same when the supply is cut off without removing the cassette.

In the embodiment represented in FIG. 39 comprising a plate with 3 motors, there is no mechanical element having any action whatsoever after the insertion of the cassette into the grooves with as a result the bringing together of the chassis and of the engaging of the switch K by the finger. Thus properly speaking there is no command module B since the pulse is given to the rockers by this engaging. The command module B and the drum therefore play the safety role.

The invention is applicable to the reproduction of any multi-track magnetic tapes in cassette or cartridge. This reproduction can be either audio or video. Many changes and modifications of the above described embodiments can, of course, be carried out without departing from the scope of the invention. Accordingly, that scope is intended to be limited only by the scope of the appended claims.

What is claimed is:

1. Apparatus for reproducing recordings from a tape having at least four tracks and mounted for movement in a case comprising:

a plurality of magnetic heads each mounted for detecting signals from one of said tracks, means for moving said tape past said heads, means for receiving a signal from one of said heads and producing an audio output, electronic switch means for coupling any one of said heads to said receiving and producing means and means for controlling said switch means to cause each of said heads to be sequentially coupled one at a time to said receiving and producing means to play each of said four tracks and reverse the direction of tape movement after each track has been played including means connected to said receiving and producing means for producing a trigger signal when silence continues for greater than a predetermined length of time, means connected to said trigger signal producing means for reversing the direction of tape movement whenever said trigger signal is produced, means connected to said trigger signal producing means and responsive to said trigger signal for preventing a further trigger signal for a predetermined time after a trigger signal is produced, at least two multivibrators providing four output states each associated with one of said tracks and responsive to said trigger signal to change its output state, the output state determining which of said heads is coupled to said receiving and producing means.

2. Apparatus as in claim 1 wherein said electronic switch means includes a plurality of field effect transistors equal in number to the number of tracks.

3. Apparatus as in claim 1 further including further switch means operable by the insertion of said case into the apparatus and means connected to further said switch means and said controlling means for causing said electronic switch means to couple a predetermined one of said heads to said receiving and producing means.

4. Apparatus as in claim 3 wherein said switch means couples said head to said receiving and producing means in a predetermined, fixed order.

5. Apparatus as in claim 1 wherein said moving means includes a plate with a single motor driving continuously two capstans turning in opposite directions, two pressure pulleys each of which is carried by a rocker member and tightening alternately the magnetic tape against one of the pulleys of the capstan for the purpose of driving it into one direction or the other, a cam member for alternately shifting the two rockers, said cam being moved alternately by two relays of reverse action, each one of these relays being connected to the corresponding channels of said electronic switch means.

6. Apparatus as in claim 5 wherein each one of the relays is controlled by a device composed of two semiconductors forming a logical OR circuit and a Darlington amplifying stage with large gain feeding the associated relay.

7. Apparatus as in claim 1 wherein said moving means includes a plate with three motors comprising on the one hand, on a mobile chassis, a main motor producing the driving of said magnetic tape by means of two capstans of reverse rotation, two auxiliary motors with weak coupling placed alternately in service and controlling the rotation of the winding reel, and, on the other hand a fixed chassis carrying the cassette comprising two relays each one of which moves a pressure pulley of the magnetic tape against the spindle of the adjacent capstan, means for locking and unlocking said mobile chassis with respect to the fixed chassis of the plate, means for keeping the mobile chassis in the low position, means acting against these maintenance means when the cassette is inserted into the fixed chassis and means for bringing this mobile chassis to the high position during the unlocking, relays and motors being controlled from a general supply unit supplying the necessary currents, and two further circuits for controlling in synchronization a pair of relays, one of the relays for activating the pressure pulley and the relay of the auxiliary motor correspnding to it.

8. Apparatus as in claim 7 wherein each module of control of said pair of relays comprises a circuit in logical OR receiving said signals from two decoding channels, the signals coming out of the logical OR circuit being amplified to make it possible to activate the relays concerned.

* * * * *